(12) United States Patent
Woerner

(10) Patent No.: US 7,281,363 B2
(45) Date of Patent: Oct. 16, 2007

(54) SERVICE DOG HARNESS

(75) Inventor: Michelle Woerner, Linn, KS (US)

(73) Assignee: KSDS, Inc., Washington, KS (US)

( * ) Notice: Subject to any disclaimer, the term of this patent is extended or adjusted under 35 U.S.C. 154(b) by 433 days.

(21) Appl. No.: 10/913,756

(22) Filed: Aug. 6, 2004

(65) Prior Publication Data

US 2006/0037562 A1 Feb. 23, 2006

(51) Int. Cl.
*B68C 1/00* (2006.01)
(52) U.S. Cl. .................... 54/37.1; 119/858
(58) Field of Classification Search ............. 119/858; 54/37.1; 224/148.1, 905
See application file for complete search history.

(56) References Cited

U.S. PATENT DOCUMENTS

| | | | |
|---|---|---|---|
| 2,233,397 A | 3/1941 | Bloom | |
| 3,435,867 A | 4/1969 | Hyden | |
| 4,530,309 A | 7/1985 | Collins | |
| 4,695,496 A | 9/1987 | Lee | |
| 4,974,397 A | 12/1990 | Ricken | |
| D313,677 S | 1/1991 | Hammon et al. | |
| 5,184,762 A | 2/1993 | Nevitt | |
| 5,485,810 A | 1/1996 | Sporn | |
| 5,644,902 A | 7/1997 | Kemp | |
| 5,660,146 A | 8/1997 | Sporn | |
| D383,255 S | 9/1997 | Caditz | |
| 5,887,772 A | 3/1999 | Dooley | |
| 5,896,831 A | 4/1999 | Alpert | |
| 5,918,611 A * | 7/1999 | Amato | 135/16 |
| 5,996,537 A | 12/1999 | Caditz | |
| 6,213,057 B1 | 4/2001 | Franco et al. | |
| 6,314,915 B1 * | 11/2001 | Pope et al. | 119/712 |
| 6,408,799 B1 | 6/2002 | Franck | |
| 6,571,745 B2 | 6/2003 | Kerrigan | |
| D480,843 S | 10/2003 | Sullivan | |
| 6,662,755 B2 | 12/2003 | Kato | |
| 2002/0121248 A1* | 9/2002 | Rooks | 119/856 |
| 2006/0254534 A1* | 11/2006 | Lin | 119/792 |

OTHER PUBLICATIONS

"Classi Pack" Dog Back Pack (Harness), sales brochure by Classi Products, Phoenix, Arizona. Jul. 23, 2001.
Dogs in Motion, Service Dog Support Harnesses and Equipment, www.dogs-in-motion.com/construction.htm Dec. 24, 2003.

(Continued)

*Primary Examiner*—Kimberly S. Smith
(74) *Attorney, Agent, or Firm*—Jeffrey L. Thompson; Thompson & Thompson, P.A.

(57) ABSTRACT

A service dog harness has a base member and a strap system for attaching the base member to a dog. A rigid platform is provided on a top side of the base member, and a soft cushion material extends under and beyond the sides of the rigid platform to impart a soft cushion feel over the underside of the base member. A collar strap assembly is attached to the front end of the base member and is adjustable to fit about a dog's lower neck and chest in front of the forelegs. A trunk strap assembly is connected between the left and right sides of the base member and is adjustable to fit about a dog's trunk behind the forelegs. A ventral strap is connected between the collar and trunk strap assemblies. Padded sleeves cover the collar and trunk strap assemblies to minimize discomfort to a dog wearing the harness.

15 Claims, 4 Drawing Sheets

OTHER PUBLICATIONS

Wolf Packs—Gear for Working Dogs, Dog Backpacks and Supplies for Working Dogs, www.wolfpacks.com Dec. 24, 2003.

Support Mobility Assistance Dog Harness, www.ocotc.com/comboharnesses.html Dec. 24, 2003.

Bridgeport Equipment—the Trainer's Choice, Assistance Dog Harnesses, Etc., www.bridgeportequipment.com/assistance.html Dec. 24, 2003.

* cited by examiner

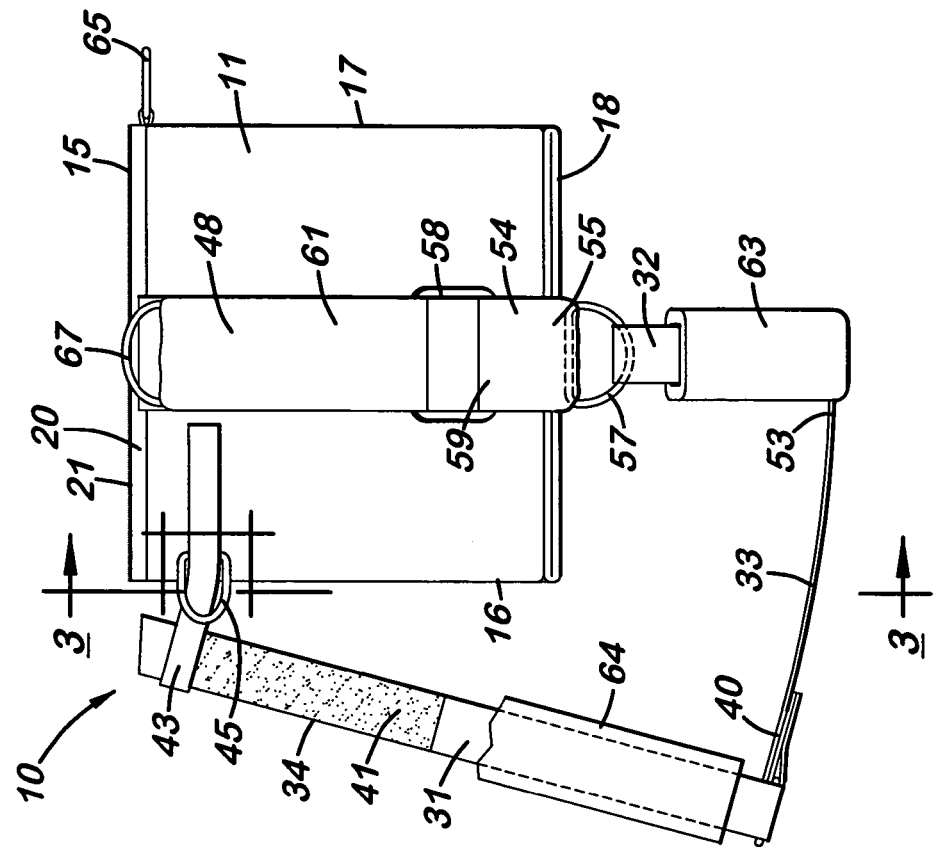
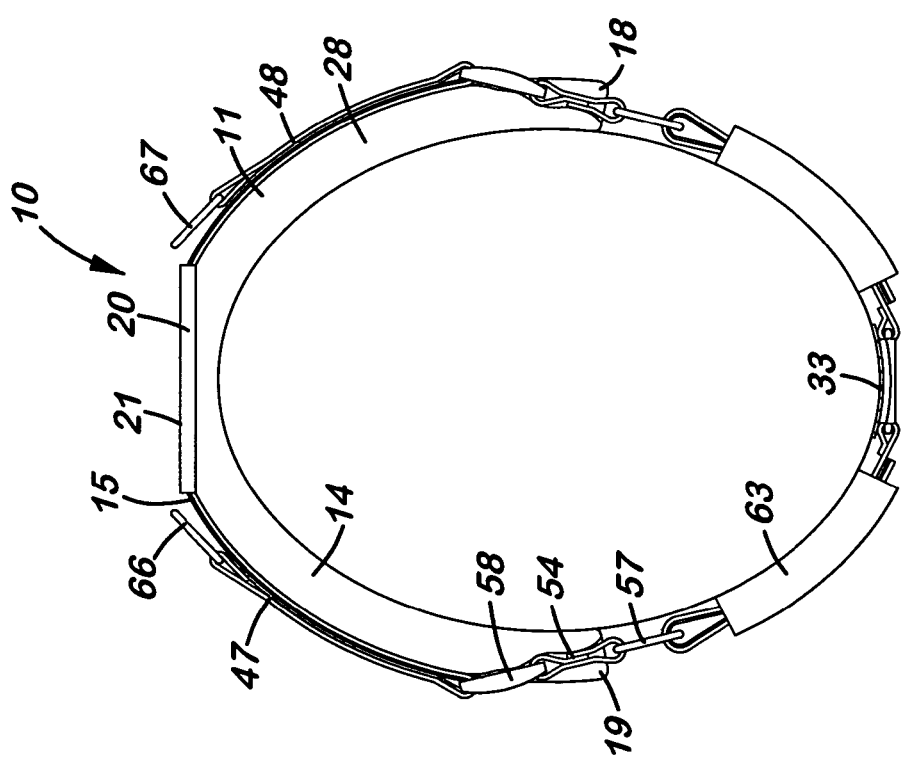

SERVICE DOG HARNESS

BACKGROUND OF THE INVENTION

1. Field of the Invention

The present invention relates generally to dog harnesses. In particular, the present invention relates to service dog harnesses that allow dogs to carry a pack and to absorb strain from a handle without discomfort to the dog.

2. Description of the Related Art

Service dogs are dogs used to help people with physical disabilities. There are various types of service dogs to accommodate various disabilities. Service dogs are often used to help people in wheelchairs by reducing the reliance on other people to perform tasks that they have difficulty performing. For example, service dogs can be used to perform physical tasks, such as retrieving objects, opening doors and drawers, turning light switches on/off, providing balance, and even pulling a wheelchair. Other specialized types of service dogs are referred to as "guide dogs" and "hearing dogs." Guide dogs are used to help blind or visually impaired people, while hearing dogs are used to help people who are deaf or hard of hearing by alerting the people of sounds.

It is often desirable to have service dogs carry a pack to hold items that the dog owner wants to take along, but does not have the ability or desire to carry themselves. For example, medication, treats for the dog, a water bottle, snacks for the owner, a first-aid kit, and various other items can be carried in the pack. At the same time, it is often desirable to secure the dog to a leash or to attach a handle to the dog. Several dog harnesses have been developed that allow both saddle bag type packs and handles to be attached to and removed from the harness. Typically, the packs have saddle bag containers that hang over either side of the dog and are secured to the harness using hook and loop fasteners, snaps or other suitable means. Removable handles can be attached to the harness in various locations, with or without the pack attached to the harness.

An example of a dog harness that carries a pack is shown in U.S. Pat. No. D480,843 issued to Sullivan. This dog harness includes adjustable neck, shoulder, chest and belly straps for securing the harness to the dog. Hook and pile fastener material is used to secure and adjust the straps to fit the dog. The topside of the harness located on the back of the dog includes lateral strips of hook/pile fastener material for mating with a corresponding material on a carrying pack for securing the pack to the harness.

Another example of a dog harness is disclosed in U.S. Pat. Nos. 5,660,146 and 5,485,810 issued to Sporn. This dog harness has a leash-controllable design that applies pressure to the sensitive pits of the dog's forelegs when the holder of the leash tugs on the leash. Protective sleeves are placed over the restraint cables that pass through the pits of the dog's forelegs to prevent chafing of the dog's foreleg crotches.

Saddle blankets and pads have been used to relieve the shock forces and stress created by placing a saddle on a horse's back. Examples of saddle pads for horses are shown in U.S. Pat. Nos. 4,695,496 and 4,974,397.

Existing dog harnesses do not effectively eliminate the discomfort to service dogs that result from carrying packs and straining against handles while performing their service tasks. Thus, there is a need in the industry for an improved service dog harness that improves the dog's comfort while providing an effective platform for carrying a pack, attaching a handle, and providing support for a disabled person.

SUMMARY OF THE INVENTION

An object of the present invention is to provide a service dog harness that overcomes the problems and disadvantages of the prior art dog harnesses described above.

A further object of the present invention is to provide a service dog harness that enhances the comfort of the service dog while providing an effective platform for carrying a pack, supporting a disabled person when necessary, and attaching a handle in a selected configuration.

It is a further object of the present invention to provide a service dog harness that is economical to manufacture, simple and efficient in use, capable of a long useful life, and particularly well suited for use with service dogs that carry packs and have handles attached to the harness.

To accomplish these and other objects, an improved service dog harness is provided that relieves stress and enhances the comfort of the service dog. The harness has a base member and a strap system for attaching the base member to a dog. A rigid platform is provided on a top side of the base member, and a soft cushion material extends under and beyond the sides of the rigid platform to impart a soft cushion feel to the dog over substantially all of the underside of the base member. The strap system includes a collar strap assembly, a trunk strap assembly, and a ventral strap. The collar strap assembly is attached to the front end of the base member and is adjustable to fit about a dog's lower neck and chest in front of the forelegs. The trunk strap assembly is connected between the left and right sides of the base member and is adjustable to fit about a dog's trunk behind the forelegs. The ventral strap is connected between the collar and trunk strap assemblies. Padded sleeves cover the collar and trunk strap assemblies to minimize discomfort to a dog wearing the harness.

According to a broad aspect of the present invention, a service dog harness is provided, comprising: a base member having an underside and a top side, a front end and a back end, and a left side and a right side, the base member having a rigid platform covering a portion of the top side of the base member for providing a rigid, substantially planar surface above a dog's back, a hook or loop type fastening material covering at least part of the planar surface, and the base member having a soft cushion material extending under the rigid platform and beyond the rigid platform to the left and right sides of the base member to impart a soft cushion feel over substantially all of the underside of the base member; a collar strap assembly attached to the front end of the base member, the collar strap assembly being adjustable to fit about a dog's lower neck and chest in front of the dog's forelegs; a ventral strap having forward and rearward ends with the forward end connected to the collar strap assembly on a side of the collar strap assembly diametrically opposed to the front end of the base member; a trunk strap assembly connected to the rearward end of the ventral strap and to the left and right sides of the base member, the trunk strap assembly being adjustable to fit about a dog's trunk behind the dog's forelegs; and a plurality of padded sleeves covering the collar strap assembly and the trunk strap assembly to minimize discomfort to a dog wearing the harness.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 3 is an end view of the service dog harness as viewed along the line 3-3 in FIG. 4.

FIG. 4 is a left side elevational view of the service dog harness according to the present invention, with the harness in an assembled condition.

DETAILED DESCRIPTION OF THE PREFERRED EMBODIMENT

Figure 1:
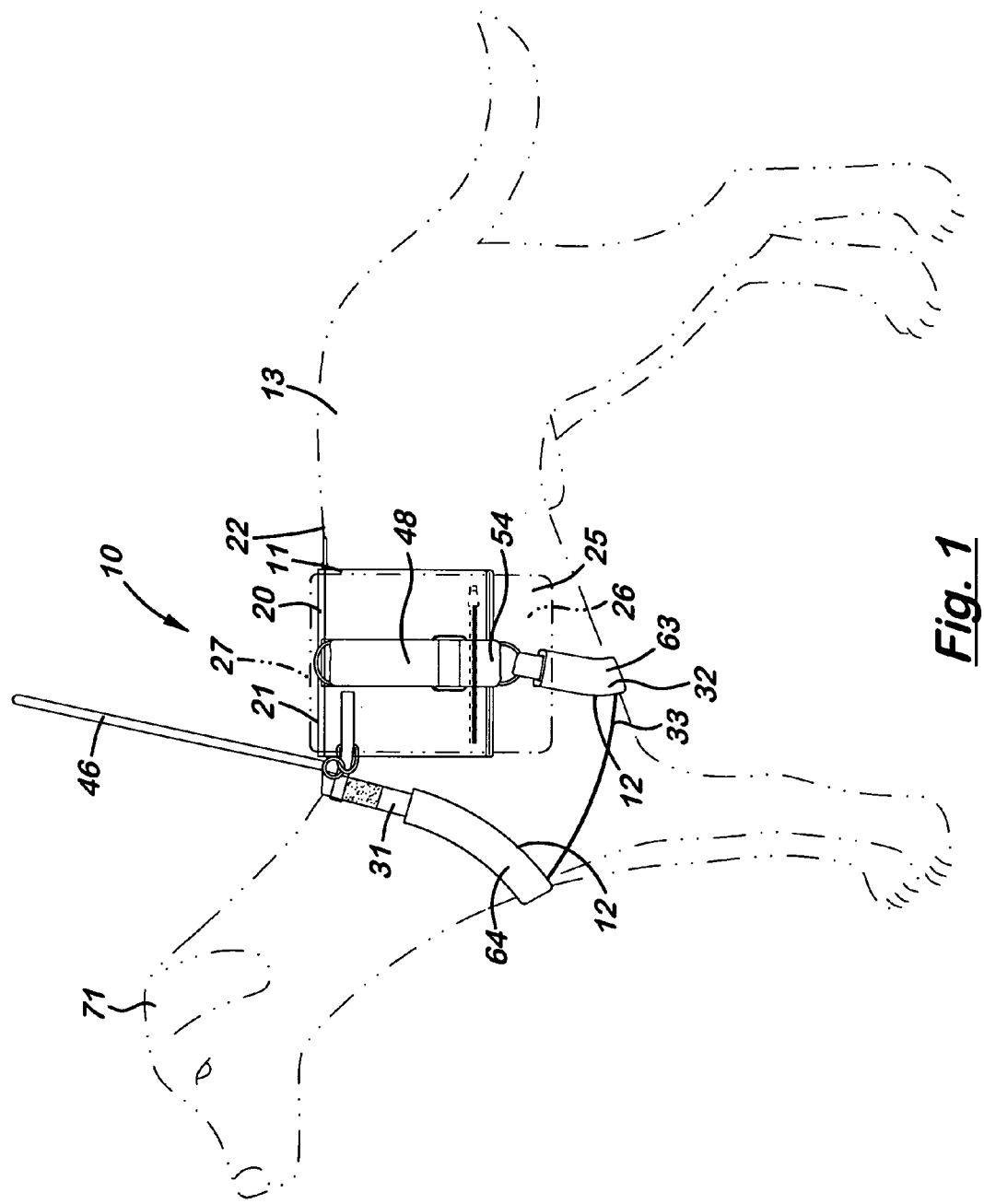
FIG. 1 is a left side elevational view of a service dog harness according to the present invention.

A service dog harness 10 according to a preferred embodiment of the present invention will now be described with reference to FIGS. 1 to 5 of the accompanying drawings.

The service dog harness 10 has a base member 11 and a strap system 12 for attaching the base member 11 to a service dog 13. The base member 11 has an underside 14 and a topside 15, a front end 16 and a back end 17, and a left side 18 and a right side 19. A hard material, such as hard plastic, plywood, or the like, is embedded within the base member 11 to provide a rigid platform 20 on the top side 15 of the base member 11. The rigid platform 20 provides a rigid, substantially planar surface 21 above the back 22 of the dog 13, which is desirable for use as a support when the dog 13 is performing services for physically disabled persons.

A hook or loop type fastening material 24 covers at least part of the planar surface 21 on the top side 15 of the base member 11, and preferably substantially all of the planar surface 21, for securing a carrying pack 25 to the base member 11. The carrying pack 25 is shown in FIG. 1 in dashed lines to facilitate illustration of the underlying harness 10. The carrying pack 25 has right and left saddle bags 26 connected by a center panel 27. The center panel 27 is adapted to substantially cover the planar surface 21 created by the rigid platform 20. The center panel 27 of the carrying pack 25 has a hook or loop type fastening material (not shown) on an underside thereof for mating with the hook or loop type fastening material 24 on the planar surface 21 of the base member 11.

The base member 11 has a soft cushion material 28 extending under the rigid platform 20 and beyond the sides of the rigid platform 20 to the left and right sides 18, 19 of the base member 11. The soft cushion material 28 functions to impart a soft cushion feel over substantially all of the underside 14 of the base member 11. Thus, a service dog 13 wearing the harness 10 will experience a soft cushion feel from the underside 14 of the base member 11 without the discomfort normally associated with service dog harnesses. The soft cushion material 28 can be, for example, a cotton pad or layer of foam rubber material sandwiched between two quilted layers 29, 30 of fabric. The soft cushion material 28 preferably has a thickness of 0.5 to 1.5 inches to provide the desired soft cushion feel.

The strap system 12 includes a collar strap assembly 31, a trunk strap assembly 32, and a ventral strap 33 connecting the collar and trunk strap assemblies 31, 32. The collar strap assembly 31 comprises right and left side collar straps 34, 35 each having a first end 36 connected to the front end 16 of the base member 11 via a first metal ring 37 or other suitable structure. The collar straps 34, 35 each have second ends 38 connected to a second metal ring 39 attached to the forward end 40 of the ventral strap 33. The second metal ring 39 is positioned on a side of the collar strap assembly 31 which is diametrically opposed to the first metal ring 37 at the front end 16 of the base member 11. The collar straps 34, 35 each have hook and loop fastening systems 41 that allow the collar straps 34, 35 to be removably connected to the second ring 39 and adjustable in length. As a result, the collar strap assembly 31 can be adjusted to properly fit about a dog's lower neck and chest in front of the dog's forelegs, as shown in FIG. 1.

Right and left side guide loops 42, 43 are attached to the front end 16 of the base member 11. The right and left side collar straps 34, 35 extend through the right and left side guide loops 42, 43, respectively, such that the guide loops 42, 43 support respective intermediate portions of the collar straps 34, 35. First and second D-rings 44, 45 are secured to the base member 11 at the base of the guide loops 42, 43 for attaching a handle 46 to the harness 10, as explained below.

The trunk strap assembly 32 includes right and left side dorsal straps 47, 48 attached to the topside 15 of the base member 11, and right and left side lower strap assemblies 49, 50. The lower strap assemblies 49, 50 each have a lower strap 51 connected to a metal ring 52 at the rearward end 53 of the ventral strap 33, and an intermediate strap 54 connected between the lower strap 51 and a respective one of the dorsal straps 47, 48. The lower straps 51 are adjustable in length and removably connected to the lower ends 55 of the intermediate straps 54 by a hook and loop fastening system 56.

The intermediate straps 54 each have a ring 57 attached at the lower end 55 thereof for fastening to the lower straps 51, and a ring 58 attached at an upper end 59 for fastening to the dorsal straps 47, 48. The dorsal straps 47, 48 each have a first portion 60 connected to the topside 15 of the base member 11 on respective right and left sides of the rigid platform 20, and a second portion 61 which is folded back and secured to the first portion 60 by a hook and loop fastening system 62. By using either the hook and loop fastening system 62 of the dorsal straps 47, 48 or the hook and loop fastening system 56 of the lower straps 51, the trunk strap assembly 32 can be adjusted to fit properly about a dog's trunk behind the dog's forelegs.

Figure 2:
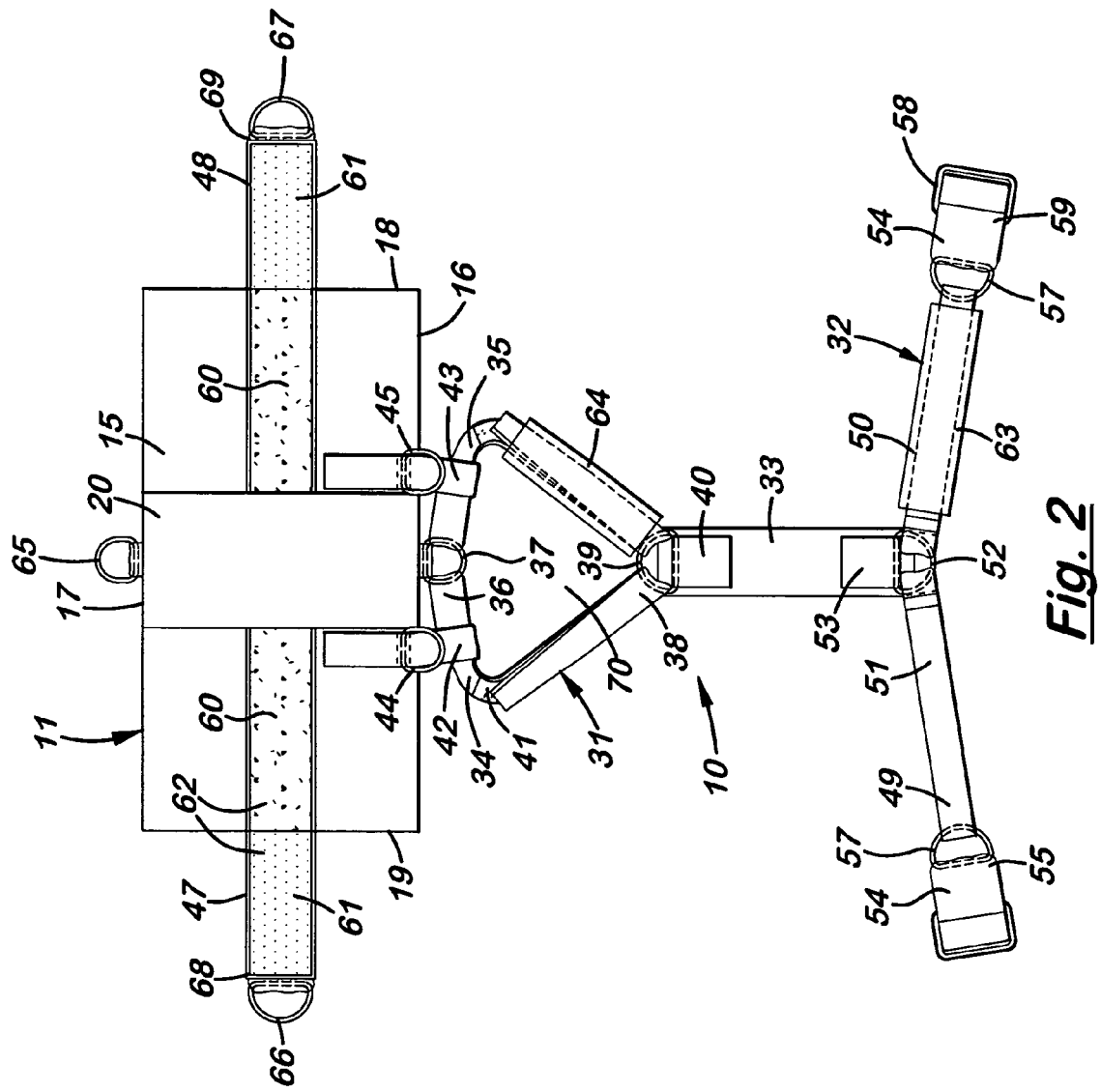
FIG. 2 is a plan view of the service dog harness shown in FIG. 1, with the harness removed from the dog and spread on a flat surface.
Figure 5:
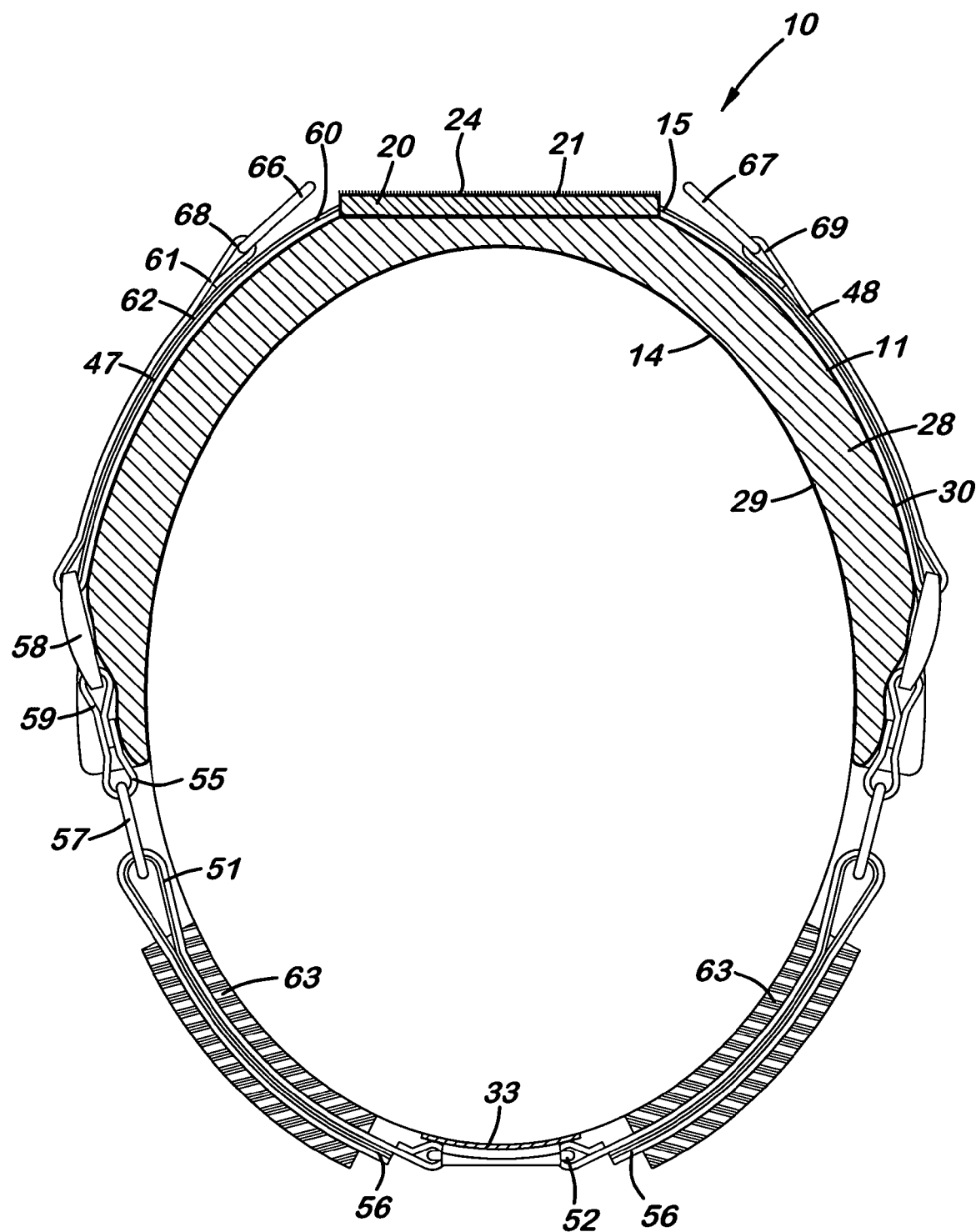
FIG. 5 is a cross sectional end view of the service dog harness according to the present invention, with the harness in an assembled condition.

A first pair of padded sleeves 63 are positioned over the right and left side collar straps 34, 35, respectively (for illustration purposes, only one of the padded sleeves 63 is shown in FIG. 2). A second pair of padded sleeves 64 are positioned over the right and left side lower straps 51, respectively (again for illustration purposes, only one of the padded sleeves 64 is shown in FIG. 2). The first and second pairs of padded sleeves 63, 64 function to provide a soft cushion feel to the dog 13 wearing the harness 10, thereby minimizing discomfort and stress on the dog 13.

A plurality of D-rings or other suitable structures are arranged at selected locations on the topside 15 of the base member 11 adjacent to an outer periphery of the rigid platform 20 for attaching a variety of types of handles 46 to the harness 10. These D-rings include the D-rings 44, 45 secured to the base of the guide loops 42, 43 at the right and left front corners of the rigid platform 20, as explained above. In addition, a third D-ring 65 is attached to the base member 11 adjacent to a midpoint at the back end 17 of the rigid platform, and fourth and fifth D-rings 66, 67 are attached to respective ends 68, 69 of the dorsal straps 47, 48. The fourth and fifth D-rings 66, 67 are held adjacent to the right and left sides of the rigid platform 20 when the second portions 61 of the dorsal straps 47, 48 are secured to the first portions 60 thereof.

The construction of the service dog harness 10 according to the present invention has been described above in detail. In use, the harness 10 is attached to a service dog 13 by first assembling the harness 10 into the form shown in FIG. 2, with the collar strap assembly 31 connected together in the form of a collar 70. The collar 70 of the harness 10 is then placed over the dog's head 71 and the base member 11 is placed onto the dog's back 22. The intermediate straps 54 are then attached to the dorsal straps 47, 48 by inserting the D-rings 66, 67 at the free ends of the dorsal straps 47, 48 through the rings 58 at the upper ends 59 of the intermediate straps 54 and pulling the dorsal straps 47, 48 through until the second portions 61 of the dorsal straps 47, 48 can be folded back against the first portions 60 of the dorsal straps 47, 48 and secured thereto by the hook and loop fastening system 62 on the dorsal straps 47, 48. The harness 10 can then be adjusted as necessary to fit the service dog 13 by releasing the various hook and loop fastening systems 41, 56, 62 and changing the length of the respective straps.

The combination of the rigid platform 20 on the topside 15 and the soft cushion material 28 on the underside 14 of the base member 11 provides a substantial improvement over existing service dog harnesses by reducing the stress and discomfort on the dog. The padded sleeves 63, 64 covering the collar strap assembly 31 and the lower straps 51 of the trunk strap assembly 32 further minimize the stress and discomfort on the dog 13. In addition, the construction of the dog harness 10 of the present invention reduces the number of straps surrounding the dog 13 and provides the dog with a higher comfort level and freedom of movement as compared to other existing service dog harnesses.

While the invention has been specifically described in connection with specific embodiments thereof, it is to be understood that this is by way of illustration and not of limitation, and the scope of the appended claims should be construed as broadly as the prior art will permit.

What is claimed is:

1. A service dog harness, comprising:
   a base member having an underside and a top side, a front end and a back end, and a left side and a right side, the base member having a rigid platform covering a portion of the top side of the base member for providing a substantially horizontal planar surface above a dog's back, and the base member having a soft padded surface covering substantially all of said underside thereof;
   a collar strap assembly attached to the front end of said base member, said collar strap assembly being adjustable to fit about a dog's lower neck and chest in front of the dog's forelegs;
   a ventral strap having a forward end connected to the collar strap assembly and a rearward end; and
   a trunk strap assembly connected to the rearward end of the ventral strap and to the left and right sides of the base member, said trunk strap assembly being adjustable to fit about a dog's trunk behind the dog's forelegs;
   wherein at least a portion of said rigid platform is covered by a hook or joop type fastening material for attaching a carrying pack to the harness; and
   further comprising a carrying pack having right and left saddle bags connected by a center panel, said center panel being adapted to substantially cover the planar surface created by the rigid platform, said center panel having a hook or loop type fastening material on an underside thereof for mating with the hook or loop type fastening material on the top side of the base member.

2. The service dog harness according to claim 1, wherein said collar strap assembly comprises right and left side collar straps each having a first end connected to a first ring attached to the front end of the base member and a second end connected to a second ring attached to the forward end of the ventral strap.

3. The service dog harness according to claim 2, wherein said right and left side collar straps each have hook and loop fastening systems that allow the collar straps to be removably connected to the second ring and adjustable in length.

4. The service dog harness according to claim 3, further comprising first and second padded sleeves positioned over the right and left side collar straps, respectively.

5. The service dog harness according to claim 4, further comprising right and left side guide loops attached to the front end of the base member, said right and left side collar straps extending through said right and left side guide loops, respectively, such that said guide loops support respective intermediate portions of said collar straps.

6. The service dog harness according to claim 4, wherein said trunk strap assembly comprises right and left side dorsal straps attached to the base member, and right and left side lower strap assemblies each having a first end connected to the rearward end of the ventral strap and a second end connected to the right and left dorsal straps, respectively.

7. The service dog harness according to claim 6, wherein said right and left side dorsal straps each have a first portion connected to said base member on respective right and left sides of the rigid platform, and a second portion which is folded back and secured to said first portion by a hook and loop fastening system.

8. The service dog harness according to claim 7, wherein said right and left side lower strap assemblies each comprises a lower strap connected to the rearward end of the ventral strap and an intemiediate strap connected between the lower strap and a respective one of said dorsal straps.

9. The service dog harness according to claim 8, wherein said lower straps are connected to said rearward end of the ventral strap via a third ring attached to the rearward end of the ventral strap, and wherein said lower straps are adjustable in length and removably connected to said intermediate straps by a hook and loop fastening system.

10. The service dog harness according to claim 9, wherein said intermediate straps comprise fourth and fifth rings at respective lower ends thereof for fastening to said lower straps, and sixth and seventh rings at respective upper ends thereof for fastening to said dorsal straps.

11. The service dog harness according to claim 10, further comprising third and fourth padded sleeves positioned over the right and left side lower straps, respectively.

12. The service dog harness according to claim 11, further comprising a plurality of D-rings arranged at selected locations adjacent to an outer periphery of the rigid platform for attaching handles to said harness.

13. The service dog harness according to claim 12, wherein said D-rings comprise first and second D-rings attached to the base member adjacent to right and left front corners of said rigid platform, and a third D-ring attached to the base member adjacent to a midpoint at a rear end of said rigid platform.

14. The service dog harness according to claim 13, wherein said D-rings further comprise fourth and fifth D-rings attached to respective ends of said dorsal straps and held adjacent to right and left sides of the rigid platform when the second portions of the dorsal straps are secured to the first portions thereof.

15. The service dog harness according to claim 1, wherein said hook or loop type fastening material covers substantially all of the planar surface created by the rigid platform on the top side of said base member.

* * * * *